United States Patent [19]

Gallagher et al.

[11] 4,356,081

[45] Oct. 26, 1982

[54] CATALYTIC REFORMING WITH RHENIUM-PLATINUM CATALYST CONTAINING MORE RHENIUM THAN PLATINUM

[76] Inventors: James P. Gallagher, 325 Indiana Ave., Park Forest, Ill. 60466; Robert M. Yarrington, 320 Wychwood Rd., Westfield, N.J. 07090

[21] Appl. No.: 144,137

[22] Filed: Apr. 28, 1980

Related U.S. Application Data

[63] Continuation of Ser. No. 894,890, Apr. 10, 1978, abandoned.

[51] Int. Cl.$^3$ .............................................. C10G 35/06
[52] U.S. Cl. .................................. 208/139; 208/138; 252/441; 252/466 PT
[58] Field of Search ........................ 208/138, 139, 89; 252/466 PT

[56] References Cited

U.S. PATENT DOCUMENTS

| | | | |
|---|---|---|---|
| 3,415,737 | 12/1968 | Kluksdahl | 208/138 |
| 3,544,451 | 12/1970 | Mitsche et al. | 208/139 |
| 3,617,520 | 11/1971 | Kluksdahl | 208/138 |

*Primary Examiner*—Curtis R. Davis
*Attorney, Agent, or Firm*—K. A. Genoni; R. S. Alexander

[57] ABSTRACT

A new reforming process employs a new rhenium-platinum catalytic composite having a rhenium to platinum weight ratio in the range of not less than 2 to about 5, whereby longer relative cycle length is obtained when reforming a naphtha having less than about 0.5 ppm by weight of sulfur than if the rhenium-platinum ratio is outside of such range.

10 Claims, No Drawings

CATALYTIC REFORMING WITH RHENIUM-PLATINUM CATALYST CONTAINING MORE RHENIUM THAN PLATINUM

This is a continuation of application Ser. No. 894,890 filed Apr. 10, 1978 and now abandoned.

BACKGROUND OF THE INVENTION

This invention relates to a new process of catalytically reforming naphtha, and a new catalytic composite to be employed therein.

Catalytic reforming of naphtha is widely employed in the petroleum refining industry to manufacture motor fuel blending stock having a greatly increased octane number, relative to the naphtha feedstock, and to manufacturing aromatics, especially benzene, toluene and xylenes. The improvement in octane number is especially important when metal-containing additives, such as tetraethyl lead (TEL), are not employed for environmental reasons. The research octane number of a blending stock or motor fuel which is free of such additives is determined by ASTM test No. D-2699, and is often referred to as the "clear" or F-1 octane number. Improvements in the manufacture of no-lead motor fuel are of particular environmental importance.

Most reforming catalysts employ platinum as a catalytic agent. Some also employ rhenium together with platinum. Both are expensive, although platinum is about 7-10 times as expensive as rhenium, and hence reforming catalyst is one of the most expensive catalysts employed in petroleum refining. Any improvements which reduce catalytic cost per barrel of naphtha reformed, such as by increasing the catalyst life (i.e., increasing the number of barrels of naphtha which can be reformed per pound of catalyst before the catalyst becomes so deactivated as to require replacement) is advantageous. This is also true in respect of increasing the cycle length of the catalyst, i.e., increasing the number of barrels of naphtha which can be reformed per pound of catalyst before the catalyst requires regeneration.

In addition, Russia and South Africa are the source of more than 95% of the free world's supply of platinum. Any improvments which decrease the amount of platinum required by industry, again, for example, by increasing the life of platinum-containing reforming catalysts, while still accomplishing the industrial purpose is a contribution to national security and also to economic independence.

The original precious commercial catalysts employed a platinum-group metal, preferably platinum itself, as the catalytic agent; see, for example, Haensel's U.S. Pat. Nos. 2,479,109-110, granted in 1949 and assigned to the Universal Oil Products Company. About 1968, the use of rhenium together with platinum was introduced. A number of references refer to rhenium-platinum catalysts. Kluksdhal's U.S. Pat. No. 3,415,737, assigned to Chevron Research Corporation, teaches that "It is preferred that the rhenium to platinum atom ratio be from about 0.2 to about 2.0. More particularly, it is preferred that the atom ratio of rhenium to platinum does not exceed one. Higher ratios (i.e. greater than one) of rhenium to platinum can be used but generally no further significant improvement is obtained." (Col. 5, lines 51-56) Within that criterion, the amount of platinum and rhenium employed may be varied, according to the patent, respectively within the range of 0.01 to 3, and 0.01 to 5, percent of the catalytic composite. (Col. 5, lines 35-48) The reasons for employing a low ratio of rhenium to platinum are stated in column 4 of the patent. The patent also teaches that the naphtha feed should be essentially free of sulfur, more preferably less than 5 ppm, and still more preferably less than 1 ppm. (Col. 7, lines 67-69)

(As employed herein, all compositions expressed in percentages or parts per million are by weight unless otherwise noted. Because the atomic weights of rhenium and platinum differ only slightly, an atomic ratio of 1 is the same as a rhenium to platinum weight ratio of 0.955.)

Kluksdhal's U.S. Pat. No. 3,558,477 teaches that:

"It is essential for purposes of the present invention that the atomic ratio of the rhenium to platinum be not greater than 1.0. That is, the rhenium to platinum atom ratio should be 1.0 or less that 1.0. More preferably, the atom ratio of rhenium to platinum should be less than about 0.7. Inasmuch as rhenium and platinum have almost the same atomic weight, the atomic ratio is essentially the same as the weight ratio." (Col. 3, lines 26-33)

The patent also discloses the same amounts of rhenium and platinum in the catalytic composite, and of sulfur in the naphtha, as does U.S. Pat. No. 3,415,737; see col. 1, line 62, and col. 7, lines 48-51.

The teachings in respect of the rhenium to platinum ratio and the total amount of rhenium as stated in the above-quoted Kluksdahl's U.S. Pat. No. 3,415,737 are either repeated or expressly incorporated by reference in Jacobson and Spurlock's U.S. Pat. No. 3,449,237, at col. 3, lines 1-24; in Jacobson and Vanselow's U.S. Pat. No. 3,558,479, at col. 5, lines 50-69; and in Jacobson's U.S. Pat. No. 3,578,582, at col. 1, line 45. U.S. Pat. No. 3,578,582 also teaches that rhenium-platinum reforming catalysts may be presulfided, by treating fresh catalyst, before use in reforming, with hydrogen sulfide or an alkyl mercaptan in an amount sufficient to add 0.05 to 2 mols, preferably 0.1 to 1 mol, of sulfur per mol of rhenium and platinum; see col. 2, line 68 to col. 3, line 12.

Buss' U.S. Pat. No. 3,578,583 teaches the inclusion of a minor amount, up to 0.1 percent, of iridium in a catalyst having up to 0.3 percent each of rhenium and platinum.

An article entitled "New Development In Reforming" by Messrs. Haensel, Pollitzer & Hayes (of Universal Oil Products Company), Proceedings of the Eighth World Petroleum Congress, Vol. 4, pages 255-261 (1971) teaches that the yield of $C_5+$ liquid product reformate reaches a maximum when the rhenium constitutes 50 percent of the total catalytic metal (i.e., a rhenium to platinum weight ratio of 1), and that thereafter the yield of liquid product reformate declines as the relative weight of rhenium to platinum is either increased or decreased. It states that "The relationship shown [in FIG. 5 of the article] holds true over a fairly wide range of platinum content, indicating that the modifying effect of rhenium is indeed exerted on the platinum." Id. at pp. 259-60.

Thus the art of reforming with rhenium-platinum catalysts has insistently taught that the rhenium to platinum ratio should be less than 2, and preferably about 1 or less.

THE INVENTION

It has now been surprisingly discovered that the cycle length of a rhenium-platinum reforming catalyst is substantially increased when the rhenium-platinum ratio is in the range of from not less than 2 to about 5, preferably in the range of from about $2\frac{1}{4}$ to about 4, and more preferably in the range of from about $2\frac{1}{2}$ to $3\frac{1}{2}$, when employing a naphtha feedstock having less than about 0.5 ppm, and preferably not more than about 0.25 ppm, of sulfur. This improvement is not only outside the teachings of the prior art, but is a unique optimum since at very high rhenium/platinum ratios, approximately above 5, the cycle length also decreases. The new catalyst is a catalytic composite comprising rhenium and platinum on a support, wherein the weight ratio of rhenium to platinum is in the range as stated above. The new process for reforming a naphtha fraction comprises subjecting naphtha having a sulfur content of less than about 0.5 ppm by weight of sulfur, to contact under reforming conditions and in the presence of gaseous hydrogen with a catalytic composite comprising a support, rhenium and platinum, the weight ratio of rhenium to platinum being in the range of from not less than 2 to about 5, whereby the relative cycle length of the catalytic composite is greater than if the rhenium to platinum ratio were to be outside the range stated. The preferred weight ratio of rhenium to platinum is in the range of from about $2\frac{1}{4}$ to about $3\frac{1}{2}$.

Except for the increased rhenium-platinum weight ratio, the new catalytic composite may be made in the same manner as has been known heretofore for making catalysts having a lower rhenium-platinum ratio. The amount of platinum may be in the range of from about 0.1 to about 2 percent, preferably in the range of about 0.1 to 0.4 percent, with the rhenium content being adjusted to furnish the desired rhenium-platinum ratio within the stated range. The support is typically eta or gamma alumina, and may optionally contain silica, magnesia, oxides of rare earth metals, and synthetic zeolites, which are sometimes referred to as molecular sieves. Typically, up to about 1 percent of the catalytic composite comprises halides, especially chloride or fluoride.

The catalyst is preferably presulfided prior to use in reforming in order to avoid excessive hydrocracking when the catalyst is initially on stream. The presulfiding treatment is conducted by contacting the catalyst with a gaseous stream containing hydrogen sulfide, an alkyl mercaptan or carbon disulfide, preferably admixed with gaseous hydrogen, until the catalyst contains in the range of about 0.1 to about 0.5 parts by weight of sulfur per part of rhenium, i.e., in the range of about 0.6 to about 3 mols of sulfur per mol of rhenium. Preferably not more than about 0.25 parts of sulfur per part of rhenium is applied to the catalyst in the presulfiding step, e.g., about 0.17 parts of sulfur per part of rhenium.

The process of reforming with the new catalyst is essentially the same as with the prior art catalyst having a lower rhenium-platinum ratio, except that the naphtha feed should have a sulfur content of less than about 0.5 ppm, and preferably not more than about 0.25 ppm, in order to achieve the superior catalyst life and about an equivalent yield of $C_5+$ liquid reformate obtainable with a catalyst having a rhenium-platinum ratio in the range of about $2\frac{1}{4}$ to about 5. Normally the naphtha feedstock will be hydrotreated or otherwise desulfurized by processes known in the art. Although the prior art teaches the use of naphthas having less than 1 ppm of sulfur, the catalysts of this invention require naphthas having the very low sulfur levels identified above.

Halides may be added to the reaction zone during reforming, such as by injecting hydrogen chloride, carbontetrachloride or an alkyl halide into the naphtha feed and/or into the recycle hydrogen gas stream entering the reaction zone of the reformer. The amount of water in the reaction zone should be adjusted to maintain a molar ratio of water to chloride in the range of about 20 to 80, preferably about 40:1.

After the activity of the catalytic composite has declined by reason of an accumulation of carbonaceous deposits, generally referred to as "coke," the catalyst may be regenerated by procedures known in the art. However, it is a characteristic of the catalyst having a rhenium-platinum ratio within the range described herein that a greater amount of coke may be accumulated thereon before the activity declines to an unsatisfactory level, as indicated by a reduction in the yield of $C_5+$ reformate and/or the clear octane number of the reformate, than is the case for catalysts having a rhenium-platinum ratio of less than 2. Hence, the regeneration procedure will require somewhat more time, and precautions, known in the art, should be taken to avoid excessive flame front temperatures during the regeneration operation, to the end of avoiding damage to the catalyst by reason of localized overheating.

The remarkable improvement in catalyst cycle length has been established by laboratory pilot plant data described in the following examples. The examples are given to illustrate the preparation of the catalysts to be utilized in the process of this invention and their use in the catalytic reforming of naphtha. However, the examples are not presented for purposes of limiting the scope of this invention but in order to further illustrate its various embodiments.

EXAMPLE I

A series of reforming catalysts were prepared having varying weight ratios of rhenium to platinum. The catalyst preparation procedure employed is known in the prior art and is only briefly described hereinafter on a generalized basis. The preparation procedure comprised adding to a beaker the stoichiometrically desired amounts of ammonium rhenate ($NH_4ReO_4$) and diammonium chloroplatinate (($NH_4)_2PtCl_6$), and de-ionized water. Aqueous ammonium hydroxide was added and the reaction mixture heated with hand stirring to a temperature in the range of 81°–83° C. and until all of the ingredients were dissolved in solution and a light straw-yellow color appeared. A 10% aqueous HCl solution and more de-ionized water were added. The solution was then heated to 90°–94° C. The mixture was poured over the desired amount of 1/16th inch gamma alumina extrudates disposed in a rapidly rotating dish. After about one minute or less, the alumina extrudates were removed from the dish and covered with a watch glass. The extrudates were maintained for one hour by means of an infrared lamp at a temperature of at least 40° C. and up to a maximum of about 65° C., with occasional stirring by hand. The catalyst was then dried with air at 105°–115° C. Thereafter the catalyst was calcined in dry air flowing at a rate of about 1,000 V/V/hour for two hours at 210° F. and then for two hours at 900° F.

The analyses of Catalysts A–H is shown in Table I.

TABLE I

| Catalyst | Composition, wt. % | | | Wt. Ratio, Re/Pt |
|---|---|---|---|---|
| | Pt | Re | Cl | |
| A | 0.334 | 0.362 | 0.91 | 1.08 |
| B | 0.344 | 0.510 | 0.80 | 1.48 |
| C | 0.340 | 0.849 | 0.93 | 2.50 |

TABLE I-continued

| Catalyst | Composition, wt. % | | | Wt. Ratio, Re/Pt |
|---|---|---|---|---|
| | Pt | Re | Cl | |
| D | 0.248 | 0.516 | 0.99 | 2.08 |
| E | 0.236 | 0.860 | 0.97 | 3.64 |
| F | 0.150 | 0.366 | 0.98 | 2.44 |
| G | 0.155 | 0.875 | 0.98 | 5.65 |
| H | 0.05 | 0.85 | 1.0 | 17 |

The foregoing catalysts were employed in reforming pilot plant runs under accelerated aging conditions to establish the relative cycle length per unit weight of platinum as a function of the rhenium/platinum weight ratio. A naphtha from a Mid-Continent crude oil was employed, the naphtha having been hydrotreated to a sulfur content of 0.21 ppm by weight. The properties of the naphtha are tabulated:

| | |
|---|---|
| Gravity, °API | 54.8 |
| Distillation | |
| IBP, °F. | 230 |
| 10% | 246 |
| 50% | 267 |
| 90% | 315 |
| 95% | 325 |
| CP | 370 |
| Sulfur, ppm | 0.21 |
| Nitrogen, ppm | 0.3 |
| Type Analysis (By Mass Spectrometer) | |
| Paraffins | 45.4% |
| Naphthenes | 42.6% |
| Aromatics | 12.0% |

The pilot plant comprised a single tubular reactor of nominal one-inch i.d. stainless steel operated isothermally. It was loaded with about 40 grams of catalyst for the reforming runs. After a freshly-prepared catalyst was loaded into the reactor, the catalyst was chemically reduced by passing hydrogen at 900° F. through the catalyst bed. The temperature was then lowered to 800° F. and the catalyst was presulfided by passing a mixture of 0.7 vol.% hydrogen sulfide in hydrogen through the catalyst bed, to a constant sulfur level for each sample of about 0.05% by weight on catalyst. The pre-heated naphtha feedstock was introduced initially at a reactor temperature of 800° F., after which the temperature was increased to 925° F. and held constant for the duration of the 300-hour aging runs. The reforming run conditions were a temperature of 925° F., a weight hourly space velocity of 4, and hydrogen/hydrocarbon molar ratio of 3, and a pressure of 200 psig. These conditions produced, at the start of the runs, a $C_5+$ reformate of about 100 research octane number without the addition of tetraethyl lead (referred to as RONC), determined by ASTM Procedure No. D-2699. During the reforming runs a mixture of methanol and an akylchloride was injected into the naphtha feedstock to maintain a constant (i.e., about 1 weight percent) chloride content on each catalyst.

The data from the reforming runs were processed as follows. During the course of the 300-hour reforming runs, the $C_5+$ liquid product was collected periodically and tested for its octane number. The measured research octane number was plotted against time on stream, and the slope of the octane-time curve was adjusted, by means known in the prior art, to compensate for any difference between the octane number of the reformate at the start of the run and the intended initial octane number of 100. The compensated research octane number of the $C_5+$ reformate was then plotted against time in hours since the start of the reforming run, often referred to as "time on feed." The slope of the octane-time curve is negative and is the octane decline rate, i.e., the time rate of octane decline. It has the dimensional units of RONC/hour and for convenience is often referred to as ΔRONC/100 hours. In catalytic reforming, it is desirable to minimize the octane decline rate, and therefore a lesser absolute value of the slope of the curve indicates a more desirable catalyst.

Table II lists the aging rate, in terms of decline of research octane number per 100 hours, for the catalysts tested. Catalyst A, which is representative of the preferred rhenium/platinum catalyst of the prior art, was arbitrarily assigned a relative cycle length of 1.00 and the relative cycle length of all of the remaining catalysts were compared to it by dividing the aging rate of Catalyst A by the aging rate of the catalyst in question. The relative cycle length per unit weight of platinum was determined by dividing the relative cycle length of a catalyst by the weight fraction of platinum (as stated in Table I) of the catalyst. The latter computation is significant because it is indicative of the efficiency with which the expensive platinum is being utilized. The data of Table II show that employing rhenium/platinum ratios of not less than 2 enables a refiner to obtain a longer cycle length and/or better efficiency in utilizing platinum, than with catalysts having a lower Re/Pt ratio. The data also establish that, surprisingly, this invention permits the use of catalyst containing a lower weight fraction of platinum (about 0.15%, in Catalysts F and G) than has been employed commercially heretofore.

TABLE II

| Catalyst | Wt. Ratio, Re/Pt | Aging Rate, ΔRONC/100 Hrs. | Relative Cycle Length | Relative Cycle Length Per Unit Weight of Platinum |
|---|---|---|---|---|
| A | 1.08 | 2.8 | 1.00 | 2.99 |
| B | 1.48 | 2.1 | 1.33 | 3.87 |
| C | 2.50 | 1.7 | 1.65 | 4.85 |
| D | 2.08 | 2.2 | 1.27 | 5.12 |
| E | 3.64 | 1.9 | 1.47 | 6.23 |
| F | 2.44 | 2.5 | 1.12 | 7.47 |
| G | 5.65 | 3.4 | 0.82 | 5.47 |
| H | 17 | 33 | 0.08 | 1.60 |

EXAMPLE II

Catalyst C was compared with Catalyst A when employing naphtha feedstocks of different sulfur content. The test conditions were the same as those referred to in Example I, except that the sulfur content of the feedstock naphtha was adjusted by adding thiophene to increase the sulfur content to 10 ppm by weight. The results of the aging test employing naphtha feedstocks having sulfur contents of 0.2 and 10 ppm are stated in Table III. As was illustrated in Example I, Catalyst C of this invention has a slower aging rate than Catalyst A of the prior art. The relative cycle length, and also the relative cycle length per unit weight of platinum, of Catalyst C of this invention is greater than that of Catalyst A of the prior art when the sulfur content of the feedstock is 0.2 ppm, but conversely if the sulfur content is 10 ppm. These data establish that for optimum utilization of the invention, the sulfur content of the naphtha feedstock should be reduced to less than 0.5, and preferably to less than 0.25, ppm.

TABLE III

| Catalyst | Feedstock Sulfur, ppm | Aging Rate, ΔRONC per 100 hrs. | Relative Cycle Length | Relative Cycle Length Per Unit Weight of Platinum |
|---|---|---|---|---|
| A | 0.21 | 2.8 | 1.00 | 2.99 |
| A | 10 | 4.0 | 0.70 | 2.10 |
| C | 0.21 | 1.7 | 1.65 | 4.85 |
| C | 10 | 6.2 | 0.45 | 1.32 |

EXAMPLE III

Catalysts A, C and G were employed in reforming pilot plant runs which further illustrate the process of this invention. The hydrotreated naphtha from a Mid-Continent crude oil had the properties tabulated below:

| | | |
|---|---|---|
| Gravity, °API | | 54.7 |
| Distillation | | |
| IBP, °F. | | 217 |
| 10% | | 242 |
| 50% | | 268 |
| 90% | | 322 |
| 95% | | 344 |
| EP | | 366 |
| Sulfur | | 0.57 ppm |
| Nitrogen | | 0.77 ppm |
| Type Analysis (by Mass Spectrometer) | | |
| Paraffins | | 45.5 |
| Naphthenes | | 42.8 |
| Aromatics | | 11.7 |

The reforming pilot plant, and the processes of reducing and pre-sulfiding the fresh catalyst, were the same as described in Example I, except that the amount of sulfur added to each catalyst was varied to furnish about 0.17 parts of sulfur per part by weight of rhenium, according to the following table:

| Catalyst | Sulfur on Catalyst, wt. % | Wt. Ratio, S/Re |
|---|---|---|
| A | 0.06 | 0.166 |
| C | 0.15 | 0.177 |
| G | 0.15 | 0.171 |

Each such catalyst was employed for reforming at a temperature of 900° F., a pressure of 175 psig, a hydrogen-hydrocarbon molar ratio of 9, and a space velocity in the range of 2 to 12, which was varied to adjust the octane level of the $C_5+$ reformate to 91 RONC. The runs were terminated after about two barrels of naphtha per pound of catalyst had been processed, and the used catalyst was analyzed for carbon content. The pertinent data are tabulated below:

| Catalyst | Wt. Ratio, Re/Pt | Average WHSV at 91 RONC | Yield of Reformate at 91 RONC | Carbon on Used Catalyst Wt. % of Catalyst | Carbon on Used Catalyst % Per Unit Wt. of Pt |
|---|---|---|---|---|---|
| A | 1.08 | 7.0 | 87.6 | 1.15 | 3.44 |
| C | 2.5 | 6.7 | 85.8 | 0.49 | 1.44 |
| G | 5.65 | 6.0 | 85.6 | 0.28 | 1.81 |

The activities of the catalysts, as indicated by the weight hour space velocities and the yields of $C_5+$ reformate, were about equal for the catalysts although the initial sulfur levels differed. In addition, the reduction in the amount of carbon (often referred to as coke) on the used catalysts as the rhenium/platinum ratio is increased is indicative that the rhenium exerts an on-stream cleansing effect, which is consistent with the greater relative cycle length obtainable with catalysts having an increased rhenium/platinum ratio relative to catalysts of the prior art.

Having thus described the invention, what is claimed is:

1. A process for reforming a naphtha fraction, which process comprises subjecting a naphtha having a sulfur content of less than about 0.5 ppm by weight of sulfur, to contact at reforming conditions and in the presence of gaseous hydrogen with a catalytic composite consisting essentially of an alumina support; a minor catalytically effective amount of rhenium component; 0.1 to 0.4 weight percent platinum component; and a minor catalytically effective amount of at least one halogen component, the weight ratio of rhenium to platinum being in the range of from not less than 2 to about 5, whereby the relative cycle length of said catalytic composite is greater than if the rhenium to platinum ratio is outside said range.

2. The process of claim 1, wherein the catalyst composite is presulfided prior to the reforming cycle sufficiently to impart thereto between about 0.1 and about 0.5 parts by weight of sulfur per part of rhenium.

3. The process of claim 1 wherein the weight ratio of rhenium to platinum in the catalytic composite is from about $2\frac{1}{4}$ to about 4.

4. The process of claim 1 wherein the weight ratio of rhenium to platinum in the catalytic composite is from about $2\frac{1}{2}$ to $3\frac{1}{2}$.

5. A method for increasing catalyst cycle length of a rhenium-platinum reforming catalytic composite, enjoying improved efficiency in utilizing the platinum component, and permitting the use of a lower weight fraction of platinum-to-catalytic composite comprising
   (a) desulfurizing naphtha feedstock to obtain a modified feedstock containing less than about 0.5 ppm by weight sulfur; and
   (b) contacting the modified feedstock at reforming conditions, in the presence of gaseous hydrogen, with a catalyst composite consisting essentially of an alumina support; a minor catalytically effective amount of rhenium component; 0.1 to 0.4 weight percent platinum component; and a minor catalytically effective amount of at least one halogen component, the weight ratio of rhenium-to-platinum therein being in the range of from not less than 2 to about 5.

6. The process of claim 5, wherein the weight ratio of rhenium to platinum is in the range of about $2\frac{1}{4}$ to about 4.

7. The process of claim 5, wherein the sulfur content of the naphtha feedstock is not more than about 0.25 ppm by weight.

8. The process of claim 5 wherein the weight ratio of rhenium to platinum in the catalyst composite is from about $2\frac{1}{2}$ to $3\frac{1}{2}$.

9. The process of claim 7 wherein the weight ratio of rhenium to platinum in the catalyst composite is from about $2\frac{1}{2}$ to $3\frac{1}{2}$.

10. The process of claim 7 wherein the weight ratio of rhenium to platinum is from about $2\frac{1}{4}$ to about 4.

* * * * *

UNITED STATES PATENT AND TRADEMARK OFFICE
CERTIFICATE OF CORRECTION

PATENT NO. : 4,356,081

DATED : October 26, 1982

INVENTOR(S) : James P. Gallagher and Robert M. Yarrington

It is certified that error appears in the above-identified patent and that said Letters Patent are hereby corrected as shown below:

In Claim 2, the first line should be corrected to read:

--The process of claim 5, wherein the catalyst com- --

Signed and Sealed this

Fifteenth Day of February 1983

[SEAL]

Attest:

GERALD J. MOSSINGHOFF

Attesting Officer

Commissioner of Patents and Trademarks